（12) United States Patent
Ellis

(10) Patent No.: US 6,274,036 B1
(45) Date of Patent: Aug. 14, 2001

(54) FILTER

(76) Inventor: Donn Ellis, 3624 Chevron Dr., Highland, MI (US) 48031

( * ) Notice: Subject to any disclaimer, the term of this patent is extended or adjusted under 35 U.S.C. 154(b) by 0 days.

(21) Appl. No.: 09/343,127

(22) Filed: Jun. 29, 1999

(51) Int. Cl.[7] .......................... B01D 35/02; B01D 29/25; B01D 29/37; E03F 5/06; E03F 5/14
(52) U.S. Cl. .......................... 210/164; 210/238; 210/474
(58) Field of Search .................................. 210/163, 164, 210/474, 477, 238

(56) References Cited

U.S. PATENT DOCUMENTS

| | | |
|---|---|---|
| 1,711,674 * | 5/1929 | Egan . |
| 4,268,390 | 5/1981 | Cunningham .......................... 210/232 |
| 4,798,028 | 1/1989 | Pinion ....................................... 52/16 |
| 5,372,714 | 12/1994 | Logue, Jr. .............................. 210/164 |
| 5,562,819 | 10/1996 | Turner, Jr. et al. ...................... 210/85 |
| 5,575,925 | 11/1996 | Logue, Jr. .............................. 210/747 |
| 5,587,072 | 12/1996 | Regan .................................... 210/232 |
| 5,632,888 | 5/1997 | Chinn et al. ........................... 210/163 |
| 5,632,889 | 5/1997 | Tharp .................................... 210/165 |
| 5,643,445 | 7/1997 | Billias et al. .......................... 210/162 |
| 5,679,246 | 10/1997 | Wilcox et al. ......................... 210/165 |
| 5,725,782 | 3/1998 | Chinn et al. ........................... 210/767 |
| 5,733,445 | 3/1998 | Fanelli .................................. 210/164 |
| 5,744,048 | 4/1998 | Stetler .................................. 210/803 |
| 5,769,566 | 6/1998 | Shea ........................................ 405/52 |
| 5,772,882 | 6/1998 | Chang ................................... 210/460 |
| 5,820,762 | 10/1998 | Bamer et al. ......................... 210/661 |
| 5,849,198 | 12/1998 | Sharpless ............................. 210/693 |
| 5,904,842 | 5/1999 | Billias et al. ......................... 210/162 |
| 5,954,952 * | 9/1999 | Strawser, Sr. . |
| 5,985,157 * | 11/1999 | Leckner et al. . |
| 6,010,622 * | 1/2000 | Chinn et al. . |
| 6,086,758 * | 7/2000 | Schilling et al. . |

* cited by examiner

*Primary Examiner*—Thomas M. Lithgow
(74) *Attorney, Agent, or Firm*—Gifford, Krass, Groh, Sprinkle, Anderson & Citkowski, P.C.

(57) ABSTRACT

A filter is disclosed formed of a bag having sidewalls of a semi-permeable material. A debris dam is provided at the upper edge of one of the sidewalls and has a generally cylindrical shape formed from a porous material. The filter is intended for use in conjunction with a drainage system and the bag is mounted to be positioned below the catch basin of such system and the debris dam fits within the overflow slot normally provided. When water or another liquid passes through the filter any solid debris which the liquid might have been carrying is removed and trapped in the filter bag.

8 Claims, 2 Drawing Sheets

FILTER

FIELD OF THE INVENTION

The present invention relates generally to a filter, and more particularly to a removable filter for sewage basins.

BACKGROUND OF THE INVENTION

In order to prevent severe flooding from heavy rains or melted snow, most municipalities have built underground drainage systems. Water flows into the underground drainage basin by passing through a basin grate, usually placed on one side of a road, before it is released into an underground sewer line. Such basin grates are often provided with an overflow slot which receives the runoff and directs it to the sewer system when the runoff is at a greater rate than the catch basin can handle.

Ideally, the water entering the drainage basin should be free of any solid debris or other environmental contaminants. Such solid debris and environmental contaminants can cause blockage in the system which can result in flooding as well as causing damage to the basin and sewer line if allowed to pass through freely.

In addition, recent state and federal legislation has required a reduction in water pollution and debris and dirt in the runoff. One source of water pollution is the solid debris and environmental contaminants which are carried by the flow of water to, and released into drainage basins. A great deal of particulate matter can be picked up for instance when a source of the water is in an area in which the ground has been disturbed, such as is the case at most construction sites. Consequently, many governmental agencies are requiring developers to provide some means of preventing the runoff which enters the drainage system from carrying with it debris and particulate matter.

In order to filter the runoff that enters a drainage basin at construction sites, filters have been placed, usually above ground, around the grate of the drainage basin. Not only are these devices an eyesore, but they also tend to greatly impede the flow of water into the drainage basin because of either the debris which the filter collects or the filter itself. Such impedance could cause the exact flooding which these basins are meant to prevent. Underground basin filters such as that disclosed in U.S. Pat. Nos. 5,575,925 and 5,372,714 solve some of these problems but they do not include a means of filtering the water which enters the drainage system through the overflow slot.

U.S. Pat. No. 5,632,888 discloses a catch basin filter which includes means for filtering water flowing through the overflow slot but the filter shown in the patent is different to install and to remove for cleaning or replacement.

There exists a need then for an underground filter which can be easily manufactured and which can be readily mounted in place to separate and prevent solid debris from entering a drainage basin, not permitting any portion of the water flow to enter the drainage basin either through the grate or the overflow slot without passing through the filter.

SUMMARY OF THE INVENTION

The invention is a filter for a drainage basin comprising a filter bag formed with two sidewalls which are joined at their edges and with an open top so that when the sidewalls are separated a filter bag is formed through which water may pass. A debris dam joined to the upper edge of one of the sidewalls fits into the overflow slot when the filter bag is positioned within a catch basin to prevent unfiltered runoff from entering the drainage basin through the curb overflow slot. The filter bag is secured to be positioned under a drainage basin grate. The sidewalls which constitute the boundaries of the filter bag are made of a semi-permeable geosynthetic material through which water may pass, however solid debris is trapped. Rigid rebar handles are inserted in loops formed at the top of the sidewalls. These handles remain above the drainage basin grate when the filter is in place to keep the filter bag in the proper position and to facilitate removal of the filter for cleaning or replacement.

Water, solid debris, and environmental contaminants flow through the drainage basin grate. Solid debris and environmental contaminants are separated from the water, as the water is allowed to pass through the filter bag while the debris and other contaminants are trapped within the bag. The debris dam prevents debris from entering the sewer system through the overflow slot. The debris and contaminants accumulate in the filter bag until such time as the filter is removed and the contents dumped from the filter bag. The filter may also be washed after removal. The filter may again then be installed along the opening of the drainage basin.

One advantage of the present invention is that debris and contaminants may be prevented from entering a drainage basin without causing excessive impedance to the flow of water into the basin.

Another advantage of the present invention is that the filter can be easily installed, removed, and reused.

Yet another advantage of the present invention is that unfiltered water is prevented from entering the drainage basin through the curb overflow slot.

Still another advantage of the present invention is that the filter easily collapses to occupy only a small space when not in use.

Still yet another advantage of the present invention is that it is easily and inexpensively manufactured.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION OF THE PREFERRED EMBODIMENT

Figure 1:
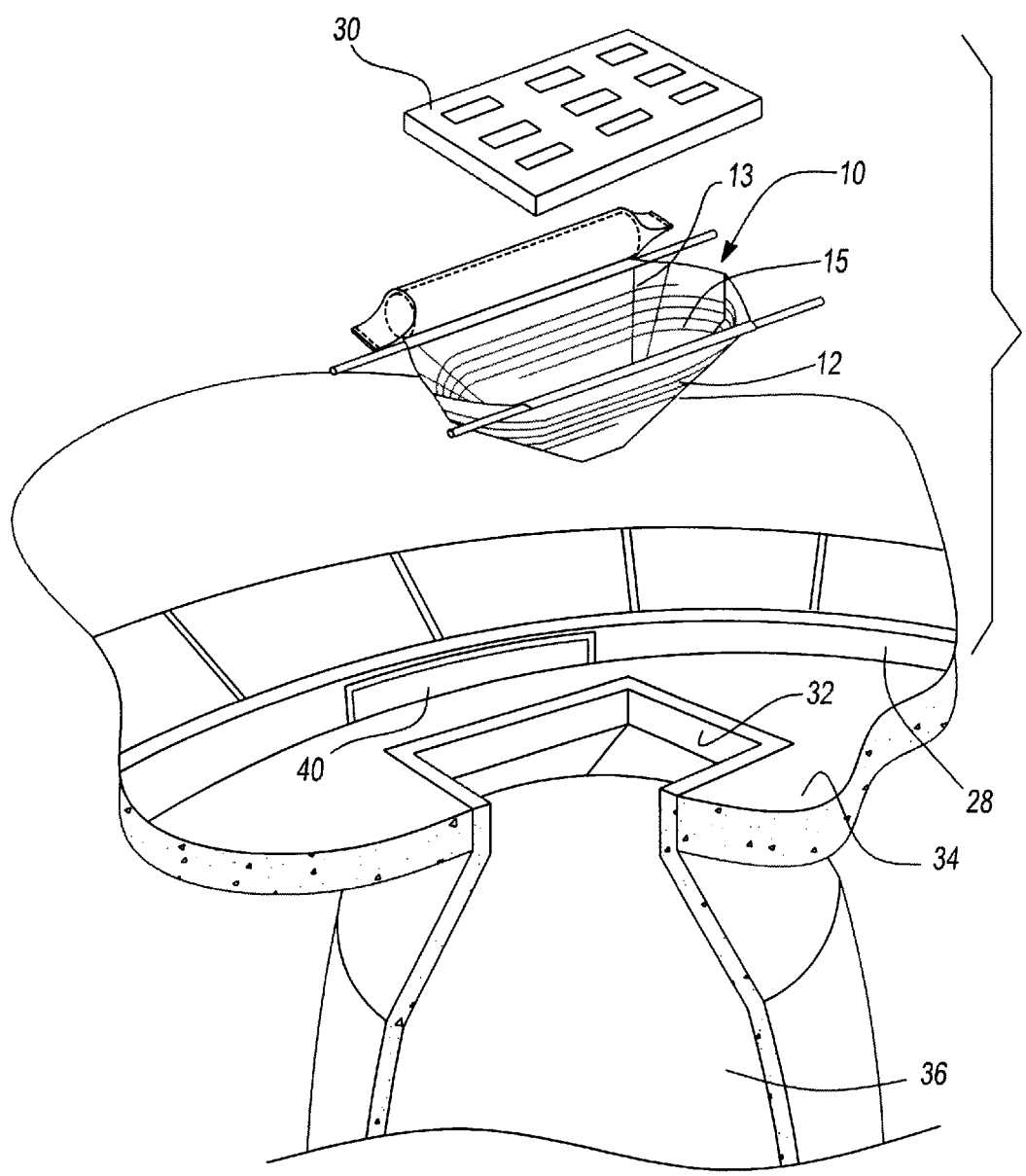
FIG. 1 is a perspective, exploded view illustrating a preferred embodiment of the present invention.

Referring to FIG. 1, a preferred embodiment of the filter 10 of the present invention is there shown and comprises a pair of opposed sidewalls 12 and 13. The sidewalls 12 and 13 are constructed from a semi-permeable geosynthetic material. As can best be seen in FIGS. 2 and 3 the sidewalls 12 and 13 are joined to one another at bottom edges 14 and side edges 16 by a means well known in the art, such as stitching, gluing, or melting. The sidewalls 12 and 13 are flexible and bendable, thus permitting a pocket 15 (FIG. 2) to be opened between them. The upper side edges 17 and top edges 19 of the sidewalls 12–13 are not directly attached to one another so as to allow flexibility and to permit the sidewalls 12–13 to be separated to form an open filter bag as can best be seen in FIG. 2. The top-most portion of each sidewall 12 and 13 is folded back and permanently attached by a method well known to those skilled in the art, similar to that utilized to conjoin the sidewalls 12 and 13 respectively to one another, to another portion of the same sidewall 12 and 13 such that a slot 24 is formed.

Rigid rebar handles 25 are inserted in the slots 24, such that the rebar handles 25 extend the length of the slots 24 and protrude a significant distance on each side of the slots 24. Although rebar handles 25 have been disclosed handles of other materials could be used in the form of rods constructed of such a material that can withstand a considerable bending force, such as steel.

A debris dam 22 is also provided and is encased by dam container 20. The debris dam 22 is composed of a porous material and is solid and cylindrical in shape. The debris dam 22 of the preferred embodiment is 3–4 feet in length, such that it may span the entire length of a curb overflow slot 40 (FIG. 1). The dam container 20 is constructed from a similar geosynthetic material as is utilized for the sidewalls 12–13. The dam container 20 is formed at the upper edge of the sidewall 13 and is completely enclosed, and may be stitched, glued, or melted to form such an enclosed area where the debris dam 22 is housed. The dam container 20 is attached to the top of sidewall 13 by means well known to those skilled in the art such as stitching, gluing, or melting or it may be formed by extending the upper portion of sidewall 13 and then turning over the upper edge upon itself and using an adhesive or sewing to attach the upper edge in place to form an enclosure.

Figure 2:
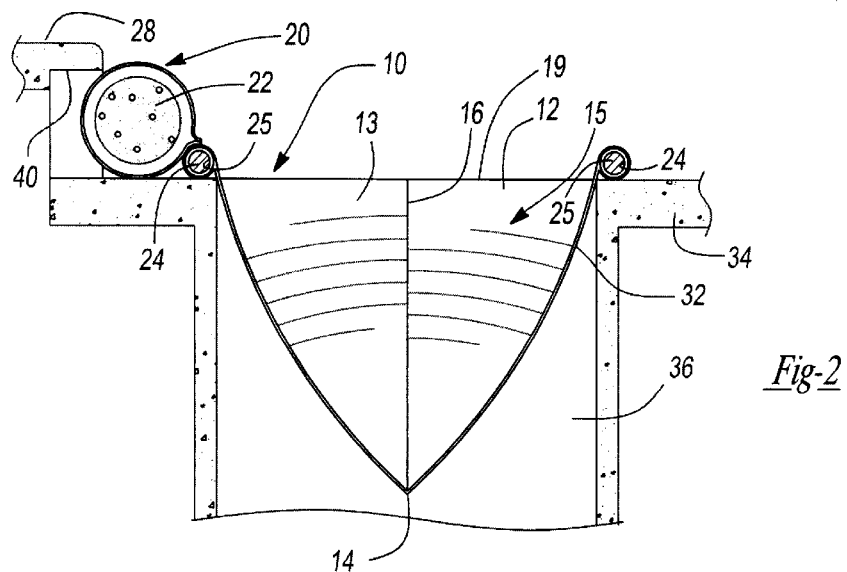
FIG. 2 is a cross-sectional view of a preferred embodiment of the present invention, installed as it would be for operation.
Figure 3:
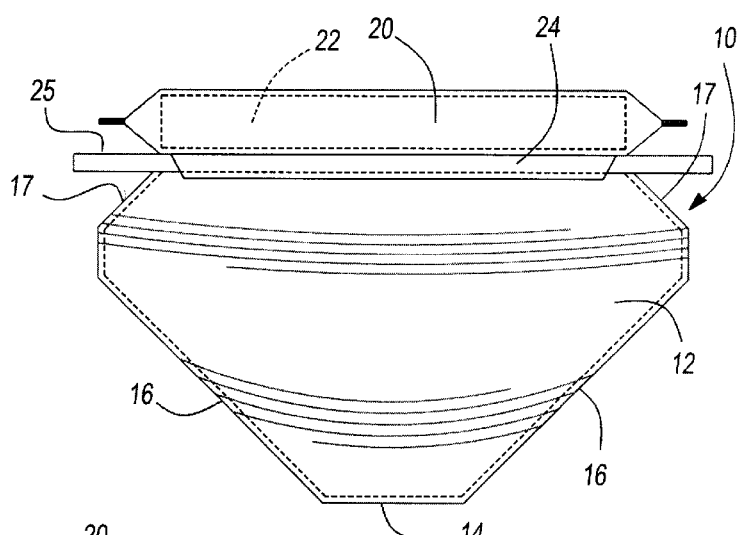
FIG. 3 is a side elevated view of the filter of the present invention.
Figure 4:
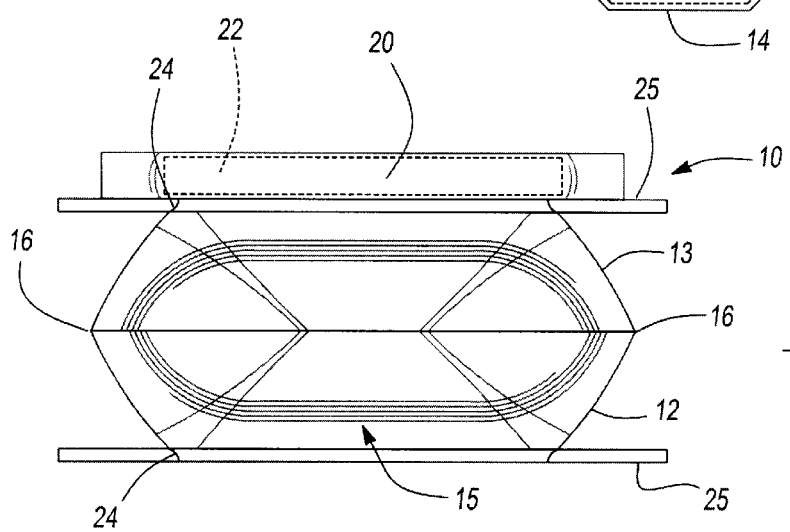
FIG. 4 is a top elevational view of the filter of the present invention substantially as seen from the top of FIG. 3.

Referring now to FIG. 1, the filter 10 of the present invention is placed in such a manner that the pocket 15 is positioned under a drainage basin grate 30. The present invention is intended for use in conjunction with a drainage basin inlet 32 located on a street 34 and adjacent to a curb 28, as shown in FIGS. 1 and 2, but can be utilized in a number of other similar situations.

There are two passageways through which runoff may enter a typical drainage basin 36; the drainage basin grate 30 and the curb overflow slot 40. The filter 10 of the present invention accounts for both of these passageways and filters all of the entering water shortly before or after it enters the drainage basin 36, thus removing debris and contaminants.

The sidewalls 12–13 are sized to conform to the dimensions of the drainage basin grate 30. The sidewalls 12–13 and the debris and contaminants which they collect are supported by the rebar handles 25 which are positioned on both sides of the drainage basin grate 30 to mount the filter 10 in place. The filter 10 may also be supported by hooks or the like (not shown) which would also serve to secure the filter 10 to the drainage basin grate 30, the curb overflow slot 32, or the curb 28. When the pocket 13 is filled, the entire filter 10 can be lifted out of the drainage basin 36, once the drainage basin grate 30 is removed, and the contents of the pocket 13 dumped. The filter 10 of the preferred embodiment of the present invention is made primarily of a geosynthetic material such that it may be washed once it is removed, further removing any trapped debris and contaminants.

It should be apparent that the water which flows through the drainage basin grate 30 must pass through one of the sidewalls 12–13 before it is finally allowed to empty into the drainage basin 36. Similarly, the water which enters the drainage basin 36 through the curb overflow slot 32 must pass through the debris dam 22 as well as the dam container 20. In the preferred embodiment, the debris dam 22 is of a large enough diameter so as to prohibit water from seeping into the curb overflow slot 32 by traveling around the debris dam 22. Additionally, the dam container 20 is in direct contact with the curb 28. Though the main function of the debris dam 22 is to guide the majority of the flow of water to pass through the drainage basin grate 30, and thus one of the sidewalls 12–13, the debris dam 22 and dam container 20 may also filter water before it passes through the curb overflow slot. Thus all of the water which ultimately enters the drainage basin 36 is filtered.

It should also be apparent that a filter has been described which can be readily manufactured and readily installed in a catch basin with means to filter the water entering the catch basin as well as the overflow slot normally provided with the catch basin.

Having described my invention, however, many modifications thereto will become apparent to those skilled in the art to which it pertains without deviation from the spirit of the invention as defined by the scope of the appended claims.

I claim:

1. A filter comprising:
   a filter bag formed of two sidewalls of a generally semi-permeable material, directly conjoined with one another, and in permanent contact with one another, on at least two sides, said conjoined sidewalls providing a structure whereby water may pass therethrough and solid debris is substantially prevented from passing therethrough;
   said conjoined sidewalls being of a bendable flexible nature so as to allow said conjoined sidewalls to move from a position generally parallel to one another to a position in which an opening is formed between the top-most portions of said sidewalls; and
   a debris dam attached to one of said sidewalls, said debris dam substantially preventing debris from travelling to one side of said filter in the event of said filter overflowing.

2. The filter as defined in claim 1 wherein at least one of said sidewalls further includes receiving means for a device to assist in the lifting of said filter system.

3. The filter as defined in claim 1 wherein said semi-permeable material is a geosynthetic material.

4. The filter as defined in claim 1 further including means to secure said filter to a drainage basin.

5. The filter as defined in claim 1 wherein said debris dam is of a porous material.

6. The filter as defined in claim 1 wherein said debris dam is encased by the same material as said sidewalls.

7. The filter as defined in claim 1 wherein said debris dam is in the form of a solid cylinder.

8. The filter as defined in claim 1 further including means to mount said debris dam in a curbside drainage basin.

* * * * *